(12) United States Patent
Kita et al.

(10) Patent No.: US 9,227,653 B2
(45) Date of Patent: Jan. 5, 2016

(54) ELECTRIC POWER STEERING SYSTEM

(71) Applicant: JTEKT CORPORATION, Osaka-shi, Osaka (JP)

(72) Inventors: Masayuki Kita, Okazaki (JP); Shinya Aono, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/249,948

(22) Filed: Apr. 10, 2014

(65) Prior Publication Data
US 2014/0311817 A1    Oct. 23, 2014

(30) Foreign Application Priority Data

Apr. 18, 2013   (JP) ................................. 2013-087658

(51) Int. Cl.
*B62D 5/04* (2006.01)
*B62D 3/12* (2006.01)
*B62D 15/02* (2006.01)

(52) U.S. Cl.
CPC .............. *B62D 3/126* (2013.01); *B62D 5/0421* (2013.01); *B62D 15/0235* (2013.01); *B62D 15/0245* (2013.01); *B62D 5/046* (2013.01); *B62D 5/0409* (2013.01); *B62D 5/0466* (2013.01)

(58) Field of Classification Search
CPC ........ B62D 5/046; B62D 5/0466; B62D 5/04; B62D 5/0409; B62D 5/0463; B62D 5/22; B62D 3/12
USPC ................................................. 180/444, 446
See application file for complete search history.

(56) References Cited

U.S. PATENT DOCUMENTS

| 4,475,413 A * | 10/1984 | Higuchi .......................... 74/422 |
| 8,775,025 B2 * | 7/2014 | Yamaguchi et al. ............ 701/41 |
| 2006/0076181 A1 * | 4/2006 | Murakami et al. ............ 180/443 |
| 2007/0205040 A1 * | 9/2007 | Miyasaka et al. ............ 180/444 |
| 2008/0167780 A1 | 7/2008 | Suzuki et al. |

FOREIGN PATENT DOCUMENTS

| DE | 10 2009 020 157 A1 | 11/2010 |
| JP | A-2000-344121 | 12/2000 |
| JP | A-2004-182138 | 7/2004 |

(Continued)

OTHER PUBLICATIONS

Extended European Search Report issued in European Patent Application No. 14164654.7 on Oct. 1, 2014.

*Primary Examiner* — Joseph Rocca
*Assistant Examiner* — Marlon Arce
(74) *Attorney, Agent, or Firm* — Oliff PLC

(57) ABSTRACT

An EPS includes a first rack and pinion mechanism that converts rotation of a pinion shaft due to a steering operation, to reciprocating motion of a rack shaft; and a steering force assist device that applies a motor torque of a motor as an assist force by using a second rack and pinion mechanism; and an ECU that controls an operation of the steering force assist device. Rack teeth of the rack shaft constituting the first rack and pinion mechanism are formed so that a steering gear ratio is changed depending on a steering angle. The ECU computes a motor neutral point by subtracting a conversion value from a motor angle detection value. The conversion value is computed based on a steering angle detection value by referring to a conversion map that is set taking into account the steering gear ratio corresponding to the steering angle.

13 Claims, 2 Drawing Sheets

(56) References Cited

FOREIGN PATENT DOCUMENTS

| JP | A-2006-160045 | 6/2006 |
| JP | A-2008-168659 | 7/2008 |
| JP | A-2010-162954 | 7/2010 |
| JP | A-2012-21890 | 2/2012 |
| JP | A-2012-25262 | 2/2012 |

* cited by examiner

ELECTRIC POWER STEERING SYSTEM

INCORPORATION BY REFERENCE

The disclosure of Japanese Patent Application No. 2013-087658 filed on Apr. 18, 2013 including the specification, drawings and abstract, is incorporated herein by reference in its entirety.

BACKGROUND OF THE INVENTION

1. Field of the Invention

The invention relates to a rack and pinion type electric power steering system.

2. Description of Related Art

Conventionally, there is an electric power steering system (EPS) in which a motor is provided as a drive source and a steering sensor is provided to detect a steering angle of a steering wheel as an absolute angle in a range exceeding 360° (for example, Japanese Patent Application Publication No. 2012-21890 (JP 2012-21890 A)). The steering sensor generally has a low resolution as compared to a relative angle sensor such as a resolver that detects a rotation angle of the motor (a motor angle) as a relative angle in a range of 360°. Thus, the steering angle may be detected as an absolute angle, based on a motor angle detection value detected by a relative angle sensor by obtaining a value of the motor angle at a steering neutral position (a motor neutral point) based on a steering angle detection value detected by the steering sensor (for example, Japanese Patent Application Publication No. 2010-162954 (JP 2010-162954 A) and Japanese Patent Application Publication No. 2012-025262 (JP 2012-025262 A)).

Specifically, the motor neutral point is computed by subtracting a conversion value from the motor angle detection value detected by the relative angle sensor. The conversion value is obtained by multiplying the steering angle detection value (a value with respect to the neutral position) detected by the steering sensor, by a constant coefficient indicating a ratio of a rotation amount of the motor with respect to a rotation amount of the steering shaft. The steering angle based on the motor angle detection value is used for, for example, performing steering return control that causes the steering wheel to return to the neutral position (for example, Japanese Patent Application Publication No. 2008-168659 (JP 2008-168659 A)).

There is an EPS that includes a steering force assist device that applies an assist force to a steering system by converting the rotation of the motor to reciprocating motion of the rack shaft through a conversion mechanism other than a rack and pinion mechanism to which the steering shaft is connected. In recent years, for the purpose of, for example, improving steering feel, an EPS with a so-called variable gear ratio has been suggested, in which specifications of rack teeth constituting the rack and pinion mechanism vary depending on a position in a rack shaft in an axial direction so that a steering gear ratio is changed depending on the steering angle (for example, Japanese Patent Application Publication No. 2004-182138 (JP 2004-182138 A)).

In a case where a variable gear ratio is employed in the EPS including the steering force assist device that includes a conversion mechanism other than the rack and pinion mechanism to which the steering shaft is connected, when the motor neutral point is obtained by the conventional method described above, the motor angle detection value detected at the time when steering is actually performed to the neutral position may be a value deviated from the motor neutral point, depending on the steering angle at this time. That is, there is a possibility that the steering angle based on the motor angle detection value may be deviated from the actual steering angle, depending on the steering angle at the time when the motor neutral point is obtained.

SUMMARY OF THE INVENTION

An object of the invention is to provide an electric power steering system with a variable gear ratio, in which an accurate steering angle can be detected as an absolute angle, based on a motor angle detection value detected by a relative angle sensor.

According to an aspect of the invention, there is provided an electric power steering system including a rack and pinion mechanism that converts rotation of a pinion shaft due to a steering operation, to reciprocating motion of a rack shaft; a steering force assist device that applies an assist force to a steering system by converting rotation of a motor to the reciprocating motion of the rack shaft by using a conversion mechanism other than the rack and pinion mechanism; a steering sensor that detects a steering angle of a steering wheel as an absolute angle; a relative angle sensor that detects a motor angle of the motor as a relative angle; and a control device that controls an operation of the steering force assist device, wherein rack teeth of the rack shaft constituting the rack and pinion mechanism are formed so that a steering gear ratio is changed depending on the steering angle, and wherein the control device computes a motor neutral point that is a value of the motor angle at a steering neutral position, by using a motor angle detection value detected by the relative angle sensor, and a conversion value that is computed based on a steering angle detection value detected by the steering sensor taking into account the steering gear ratio corresponding to the steering angle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
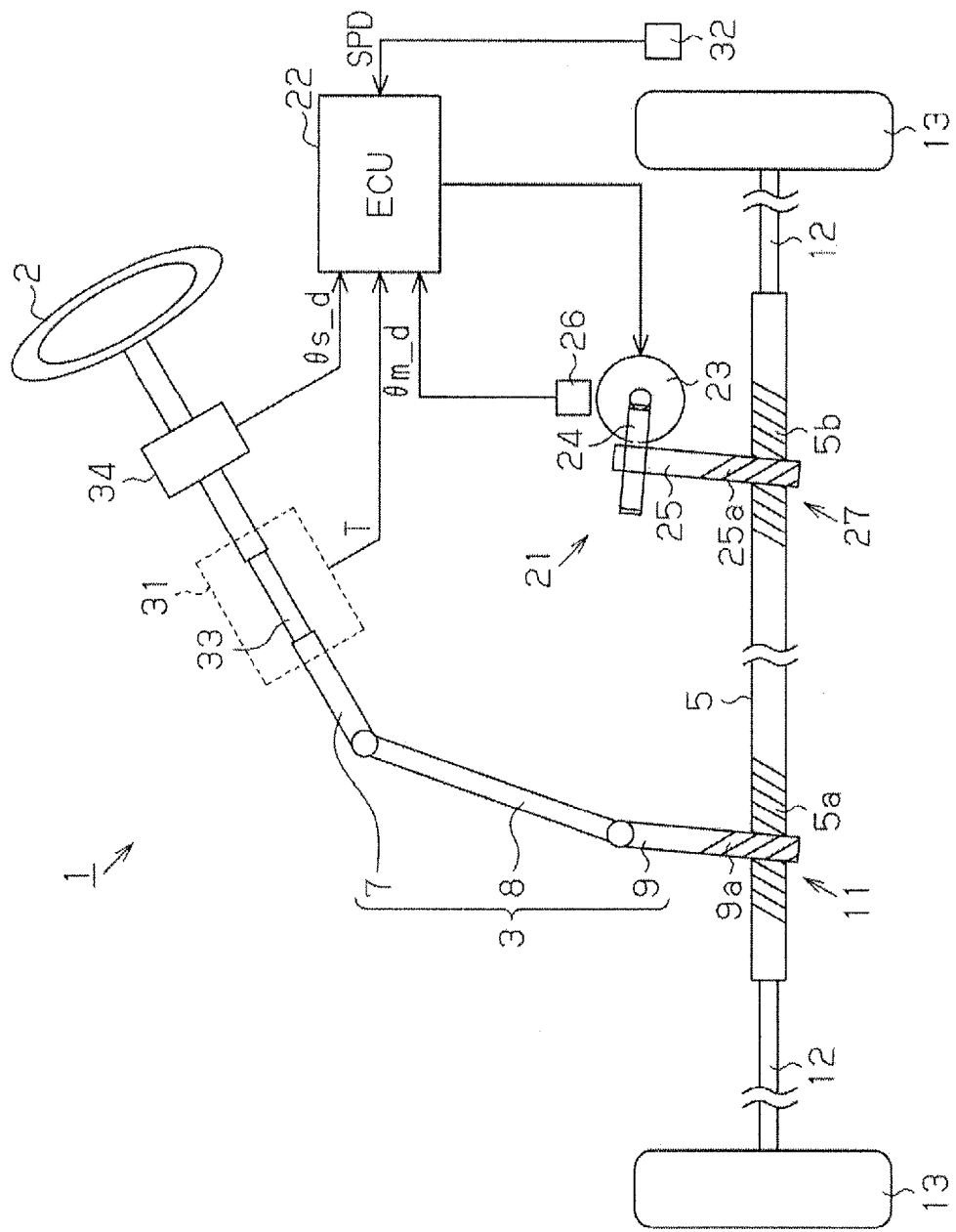
FIG. 1 is a schematic configuration diagram of an electric power steering system.

Hereinafter, an electric power steering system (EPS) according to an embodiment will be described with reference to the drawings. As illustrated in FIG. 1, an EPS 1 includes a steering shaft 3 and a rack shaft 5. A steering wheel 2 is fixed to the steering shaft 3. The rack shaft 5 reciprocates in an axial direction in accordance with rotation of the steering shaft 3. The steering shaft 3 is formed by connecting a column shaft 7, an intermediate shaft 8 and a pinion shaft 9 disposed in this order from the side of the steering wheel 2.

The rack shaft 5 and the pinion shaft 9 are disposed to intersect with each other at a predetermined intersection angle. A first rack and pinion mechanism 11 is formed by engaging first rack teeth 5a formed in the rack shaft 5 with first pinion teeth 9a formed in the pinion shaft 9. Tie rods 12 are connected to respective ends of the rack shaft 5. Leading ends of the tie rods 12 are connected to knuckles (not illustrated) to which steered wheels 13 are fitted. Therefore, in the EPS 1, the rotation of the steering shaft 3 due to the steering operation is converted to movement of the rack shaft 5 in the axial direction by the first rack and pinion mechanism 11. A steered angle of the steered wheels 13, that is, a traveling direction of a vehicle is changed by transmitting the movement in the axial direction to the knuckles through the tie rods 12.

In the EPS 1 of the embodiment, specifications (for example, a pitch, a pressure angle and the like of teeth) of the first rack teeth 5a are set to vary depending on an axial position in the rack shaft 5. The EPS 1 is configured as an EPS with a so-called variable gear ratio in which a steering gear ratio R is changed depending on a steering angle $\theta s$ of the steering wheel 2 (a rotation angle of the pinion shaft 9). That is, in the EPS 1, a steered amount of the steered wheels 13 (a moving amount of the rack shaft 5) with respect to a rotation amount of the steering wheel 2 (the pinion shaft 9) is changed depending on the steering angle $\theta s$.

Figure 2A:
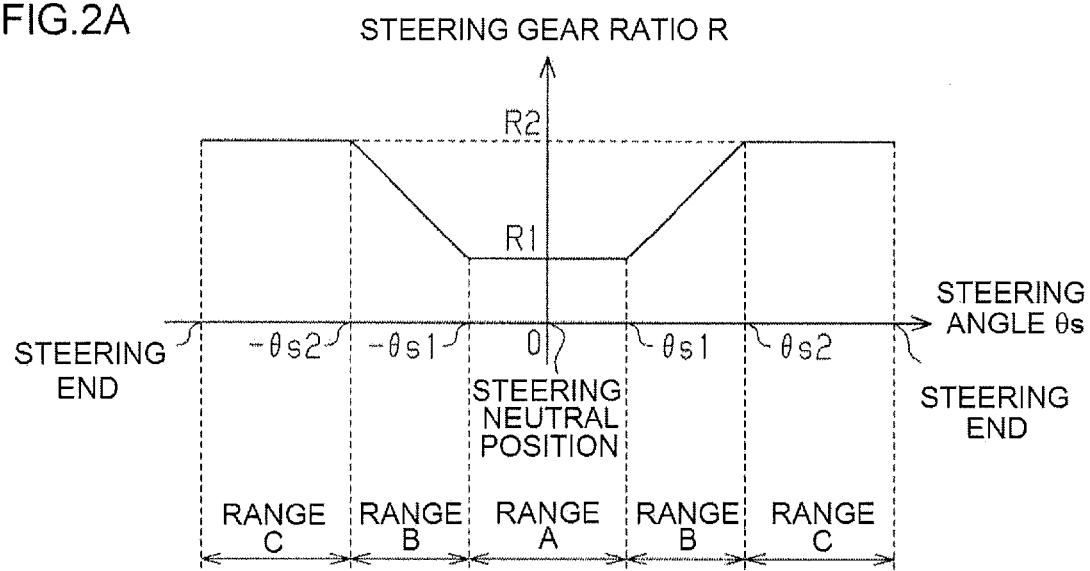
FIG. 2A is a map illustrating a relationship between a steering angle and a steering gear ratio.

Particularly, as illustrated in FIG. 2A, the steering gear ratio R is set to be a first predetermined gear ratio R1 in a range A in the vicinity of a neutral position, in which an absolute value of the steering angle $\theta s$ is equal to or smaller than a predetermined first steering angle $\theta s1$. The steering gear ratio R is set to gradually increase with an increase of the absolute value of the steering angle $\theta s$ in ranges B in which the absolute value of the steering angle $\theta s$ is greater than the first steering angle $\theta s1$ and is equal to or smaller than a second predetermined steering angle $\theta s2$ ($\theta s1<\theta s2$). The steering gear ratio R is set to be a second predetermined gear ratio R2 (R1<R2) in ranges C in the vicinity of steering ends, in which the absolute value of the steering angle is greater than the second steering angle $\theta s2$. Thus, as the steering angle $\theta s$ becomes larger, the steered angle of the steered wheels 13 is changed by a larger amount and thus, the steered wheels 13 can be turned rapidly. In FIG. 2, when steering is performed to one side (for example, the right side), the steering angle $\theta s$ is indicated by a positive value and when steering is performed to the other side (for example, the left side), the steering angle $\theta s$ is indicated by a negative value.

As illustrated in FIG. 1, the EPS 1 includes a steering force assist device 21 and an ECU 22, The steering force assist device 21 applies an assist force for assisting a steering operation to a steering system. The ECU 22 is a control device that controls an operation of the steering force assist device 21.

The steering force assist device 21 includes a motor 23 and a pinion shaft 25. The motor 23 is a drive source of the steering force assist device 21. The pinion shaft 25 is operatively coupled to the motor 23 through a speed reducing mechanism 24 such as a worm and wheel. A resolver 26 is provided for the motor 23 of the embodiment as a relative angle sensor that detects a relative angle (an electrical angle) of the rotation angle (a motor angle $\theta m$) thereof in a range of 360°. The rack shaft 5 and the pinion shaft 25 are disposed to intersect with each other at a predetermined intersection angle. A second rack and pinion mechanism 27 as a converting mechanism is formed by engaging second rack teeth 5b with second pinion teeth 25a. The second rack teeth 5b are formed on the rack shaft 5. The second pinion teeth 25a are formed on the pinion shaft 25. In the steering force assist device 21, the speed of the rotation from the motor 23 is reduced by the speed reducing mechanism 24, and the rotation, whose speed has been reduced, is transmitted to the pinion shaft 25. The rotation of the pinion shaft 25 is converted to the movement of the rack shaft 5 in the axial direction by the second rack and pinion mechanism 27 so that a motor torque is applied to the steering system as the assist force. Specifications of the second rack teeth 5b are set to be the same in an entire range in which the second rack teeth 5b are formed in the rack shaft 5.

A torque sensor 31 that detects a steering torque T input into the steering shaft 3 and a vehicle speed sensor 32 that detects a vehicle speed SPD are connected to the ECU 22. The torque sensor 31 includes a torsion bar 33 provided at an intermediate portion of the column shaft 7. The steering torque T is detected based on a torsion angle of the torsion bar 33, The ECU 22 computes a target assist force, based on the vehicle speed SPD and the steering torque T, The ECU 22 controls the operation of the steering force assist device 21 through supply of driving electric power to the motor 23 so that the steering force assist device 21 generates the target assist force, that is, the ECU 22 controls the assist force applied to the steering system through supply of the driving electric power to the motor 23.

The resolver 26 and a steering sensor 34, which detects the steering angle $\theta s$ of the steering wheel 2 (the steering shaft 3) as an absolute angle in a range of 360°, are connected to the ECU 22. The ECU 22 computes a motor neutral point $\theta m\_0$ that is a value of the motor angle $\theta m$ at a steering neutral position, based on a steering angle detection value $\theta s\_d$ detected by the steering sensor 34, as described below. The ECU 22 detects the steering angle $\theta s$ as the absolute angle, based on the motor neutral point $\theta m\_0$ and a motor angle detection value $\theta m\_d$ detected by the resolver 26. For example, the ECU 22 of the embodiment performs steering return control for improving the returning characteristic of the steering wheel 2 to the neutral position, and corrects the assist force applied to the steering system, by using the steering angle $\theta s$ based on the motor angle detection value $\theta m\_d$.

Next, calculation of the motor neutral point performed by the ECU of the embodiment will be described. The ECU 22 computes the motor neutral point $\theta m\_0$ by subtracting a conversion value $\theta sm$ from the motor angle detection value $\theta m\_d$, immediately after an ignition switch (IG) is turned ON. The conversion value $\theta sm$ is computed based on the steering angle detection value $\theta s\_d$ taking into account the steering gear ratio R corresponding to the steering angle $\theta s$.

Specifically, the ECU 22 includes a conversion map in which a relationship between the steering angle $\theta s$ and the conversion value $\theta sm$ is defined, that is, the steering angle $\theta s$ and the conversion value $\theta sm$ are associated with each other. In the conversion map, a value, which is obtained by multiplying a given steering angle $\theta s$ (a value indicating a given steering angle $\theta s$) by a coefficient indicating a ratio of the rotation amount of the motor 23 with respect to the rotation amount of the steering shaft 3 at the given steering angle $\theta s$, is mapped as the conversion value $\theta sm$, taking into account that the steering gear ratio R changes depending on the steering angle $\theta s$.

Figure 2B:
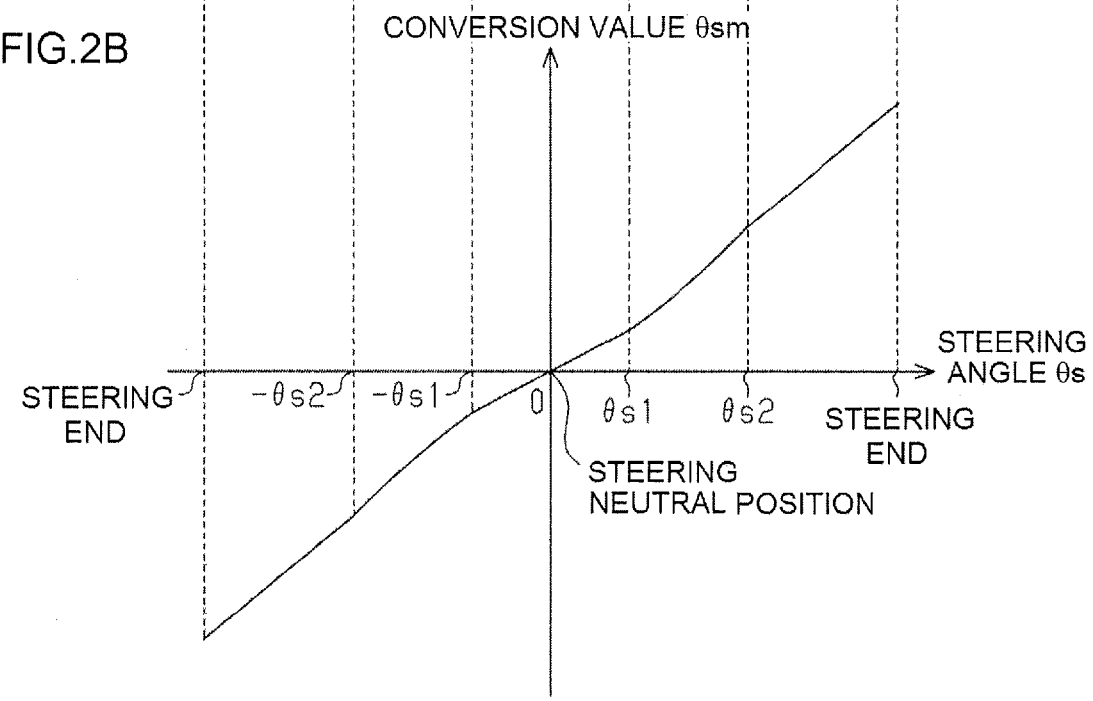
FIG. 2B is a map illustrating a relationship between the steering angle and a conversion value.

Specifically, as illustrated in FIG. 2B, in the range A in which the steering gear ratio R is the first gear ratio R1 that is a constant value, as the steering angle $\theta s$ increases, the absolute value of the conversion value $\theta sm$ linearly increases based on the first gear ratio R1. The ratio of the rotation amount of the motor 23 with respect to the rotation amount of the steering shaft 3 changes depending on the value of the steering gear ratio R. Therefore, in the ranges B in which the steering gear ratio R continuously changes, the absolute value of the conversion value $\theta sm$ non-linearly increases based on the increase in the steering angle $\theta s$. In the ranges C in which the steering gear ratio R is the second gear ratio R2 that is a constant value, as the steering angle θs increases, the absolute value of the conversion value θsm linearly increases based on the second gear ratio R2.

When the ignition switch (IG) is turned on, the ECU 22 computes the conversion value θsm corresponding to the steering angle detection value θs_d by referring to the conversion map, and computes the motor neutral point θm_0 by subtracting the conversion value θsm from the motor angle detection value θm_d (θm_0=θm_d−θsm).

Next, effects of the embodiment will be described. (1) The motor neutral point θm_0 is computed by subtracting the conversion value θsm from the motor angle detection value θm_d. The conversion value θsm is computed based on the steering angle detection value θs_d by referring to the conversion map that is set taking into account the steering gear ratio R corresponding to the steering angle θs. Thus, it is possible to prevent the motor angle detection value θm_d detected by the resolver 26 at the time when steering is actually performed to the neutral position, from becoming a value deviated from the motor neutral point θm_0, regardless of the steering angle θs at the time when the motor neutral point θm_0 is obtained. Therefore, it is possible to detect the accurate steering angle θs as an absolute angle, based on the motor angle detection value θm_d detected by the resolver 26 in the EPS 1 with the variable gear ratio. When there is deviation between the steering angle detection value θs_d and the steering angle θs based on the motor angle detection value θm_d, for example, it is possible to determine that there is abnormality in the assembly of the rack shaft 5 and the pinion shaft 9.

(2) Since the ECU 22 computes the motor neutral point θm_0 immediately after the ignition switch (IG) is turned ON, the ECU 22 can perform control promptly using the steering angle θs based on the motor angle detection value θm_d. The invention may be implemented in the following modified embodiments obtained by appropriately modifying the embodiment described above.

In the embodiment described above, a manner, in which the steering gear ratio R is changed depending on the steering angle θs, may be appropriately changed. For example, the specifications of the first rack teeth 5a may be changed so that the steering gear ratio R is continuously increased as the absolute value of the steering angle θs increases in an entire range from the neutral position to the steering ends. For example, the specifications of the first rack teeth 5a may be changed so that the steering gear ratio R is decreased as the absolute value of the steering angle θs increases.

In the embodiment described above, the steering force assist device 21 converts the rotation of the motor 23 to the reciprocating motion of the rack shaft 5 by using the second rack and pinion mechanism 27. However, the invention is not limited to this configuration. For example, the rotation of the motor 23 may be converted to the reciprocating motion of the rack shaft 5 using another conversion mechanism such as a ball screw mechanism.

In the embodiment described above, the ECU 22 obtains the motor neutral point θm_0 immediately after the ignition switch (IG) is turned ON. However, the invention is not limited to this configuration, and for example, the motor neutral point θm_0 may be obtained after a predetermined time has elapsed after the ignition switch (IG) is turned ON.

In the embodiment described above, a torsion amount of the torsion bar 33 may be computed based on the steering torque T and an elastic coefficient of the torsion bar 33, and the torsion amount of the torsion bar 33 may be taken into account when the motor neutral point θm_0 is computed.

In the embodiment described above, the ECU 22 computes the conversion value θsm corresponding to the steering angle detection value θs_d by referring to the conversion map. However, the conversion value θsm may be computed in another manner. For example, the conversion value θsm may be computed based on a function expression in which the steering angle detection value θs_d is a variable.

Next, technical ideas that can be understood from each of the embodiments and the other examples described above, and the effects thereof will be additionally described. (A) An electric power steering system in which the control device computes the motor neutral point immediately after the ignition switch is turned ON. According to the configuration described above, it is possible to promptly perform control using the steering angle based on the motor angle detection value.

According to the configuration described above, the motor neutral point is computed using the conversion value that is computed based on the steering angle detection value taking into account the steering gear ratio corresponding to the steering angle. Thus, it is possible to prevent the motor angle detection value detected by the relative angle sensor at the time when steering is actually performed to the neutral position, from becoming a value deviated from the motor neutral point, regardless of the steering angle at the time when the motor neutral point is obtained.

According to the invention, it is possible to detect the accurate steering angle as the absolute angle, based on the motor angle detection value detected by the relative angle sensor in the electric power steering system with the variable gear ratio.

What is claimed is:

1. An electric power steering system comprising:
   a rack and pinion mechanism that converts rotation of a pinion shaft due to a steering operation, to reciprocating motion of a rack shaft;
   a steering force assist device that applies an assist force to a steering system by converting rotation of a motor to the reciprocating motion of the rack shaft by using a conversion mechanism other than the rack and pinion mechanism;
   a steering sensor that detects a steering angle of a steering wheel as an absolute angle;
   a relative angle sensor that detects an amount of an angle that the motor rotates as a relative angle; and
   a control device that controls an operation of the steering force assist device,
   wherein rack teeth of the rack shaft constituting the rack and pinion mechanism are formed so that a steering gear ratio is changed depending on the steering angle,
   wherein the control device computes a motor neutral point that is a value of the motor angle at a steering neutral position, by using a motor angle detection value detected by the relative angle sensor, and a conversion value that is computed based on a steering angle detection value detected by the steering sensor taking into account the steering gear ratio corresponding to the steering angle, and
   wherein the steering force assist device uses a second rack and pinion mechanism other than the rack and pinion mechanism that converts the rotation of the pinion shaft due to the steering operation, to the reciprocating motion of the rack shaft.

2. The electric power steering system according to claim 1, wherein the steering force assist device uses a ball screw mechanism.

3. The electric power steering system according to claim 1, wherein the control device computes the motor neutral point immediately after an ignition switch is turned on.

4. The electric power steering system according to claim 2, wherein the control device computes the motor neutral point immediately after an ignition switch is turned on.

5. The electric power steering system according to claim 1, wherein the control device computes a torsion amount of a torsion bar based on an elastic coefficient of the torsion bar used in a torque sensor and a steering torque, and corrects the motor neutral point by using the torsion amount of the torsion bar.

6. The electric power steering system according to claim 2, wherein the control device computes a torsion amount of a torsion bar based on an elastic coefficient of the torsion bar used in a torque sensor and a steering torque, and corrects the motor neutral point by using the torsion amount of the torsion bar.

7. The electric power steering system according claim 3, wherein the control device computes a torsion amount of a torsion bar based on an elastic coefficient of the torsion bar used in a torque sensor and a steering torque, and corrects the motor neutral point by using the torsion amount of the torsion bar.

8. The electric power steering system according to claim 1, wherein the control device computes the conversion value corresponding to the steering angle detection value by referring to a conversion map.

9. The electric power steering system according to claim 2, wherein the control device computes the conversion value corresponding to the steering angle detection value by referring to a conversion map.

10. The electric power steering system according to claim 3, wherein the control device computes the conversion value corresponding to the steering angle detection value by referring to a conversion map.

11. The electric power steering system according to claim 1, wherein the steering gear ratio is continuously increased based on at least an increase in an absolute value of the steering angle in a range of the steering angle, and
wherein the conversion value is nonlinearly increased based on the increase in the steering angle in the range.

12. The electric power steering system according to claim 2, wherein the steering gear ratio is continuously increased based on at least an increase in an absolute value of the steering angle in a range of the steering angle, and
wherein the conversion value is nonlinearly increased based on the increase in the steering angle in the range.

13. The electric power steering system according to claim 3, wherein the steering gear ratio is continuously increased based on at least an increase in an absolute value of the steering angle in a range of the steering angle, and
wherein the conversion value is nonlinearly increased based on the increase in the steering angle in the range.

* * * * *